United States Patent [19]

Madanat

[11] Patent Number: 5,069,921

[45] Date of Patent: Dec. 3, 1991

[54] METHOD OF PREPARING AN ENCRUSTED FOOD PRODUCT

[76] Inventor: Edward A. Madanat, 8 Inverness Ct., Lindenheath, Wilmington, Del. 19808

[21] Appl. No.: 543,024

[22] Filed: Jun. 25, 1990

[51] Int. Cl.$^5$ .............................................. A21D 2/00
[52] U.S. Cl. ................................... 426/283; 426/281; 426/282; 426/549; 426/556; 426/561
[58] Field of Search ............... 426/282, 283, 284, 281, 426/516, 556, 549, 561, 138, 143

[56] References Cited

U.S. PATENT DOCUMENTS

| | | | |
|---|---|---|---|
| 1,817,114 | 8/1931 | Valenta | 426/283 |
| 3,151,987 | 10/1964 | Colby | 426/556 |
| 3,441,418 | 4/1969 | Nishikiori | 426/283 |
| 3,465,693 | 9/1969 | Lopata | 426/283 |
| 3,615,682 | 10/1971 | LaBaw et al. | 426/556 |
| 4,622,226 | 11/1986 | Kc et al. | 426/556 |
| 4,734,024 | 3/1988 | Tashiro | 426/516 |
| 4,891,233 | 1/1990 | Belanger et al. | 426/556 |

FOREIGN PATENT DOCUMENTS 3426450 1/1985 Fed. Rep. of Germany ...... 426/283

Primary Examiner—Donald E. Czaja
Assistant Examiner—D. Workman
Attorney, Agent, or Firm—Connolly and Hutz

[57] ABSTRACT

An encrusted food product, such as a pizza roll, is prepared by co-extruding a cavity-forming sealant material, such as cheese, with a bread or pastry dough whereby the cavity-forming sealant material is encapsulated in the dough, subjecting the co-extruded article to a preliminary baking whereby the cavity-forming sealant material melts and generates gases. The molten material coats the interior of the encapsulating dough and the generated gases cause expansion of the space occupied originally by the cavity-forming sealant material thus creating a cavity or void within the dough. After preliminary baking the dough with its interior void lined and sealed with molten material is chilled to set the molten material. Thereafter the void or cavity of the dough so prepared can be filled with any desired filling and baking can be completed.

9 Claims, No Drawings

METHOD OF PREPARING AN ENCRUSTED FOOD PRODUCT

BACKGROUND OF THE INVENTION

It has long been known that an elegant food dish can be obtained by baking various foods inside a pastry encapsulating crust. Beef wellington is an example.

U.S. Pat. No. 4,721,622 (Kingham) describes preparation of a shelf-stable filled food product which has a bread casing and a filling. The filling is separated from the filling by an edible barrier layer.

An edible barrier between pizza crust and other components such as tomato sauce is disclosed in U.S. Pat. No. 4,066,796 (McKee). The barrier minimizes migration of sauce into the crust thereby preserving taste and texture of the pizza product.

Selleck (U.S. Pat. No. 4,348,949) also discloses minimized saturation of a bread product by providing the baked bread with a channel with a thick crust which holds a liquid food material and acts as a liquid migration barrier.

Various edible food containers (e.g., ice-cream cones) rendered resistant to moisture from a food filling by applying a moisture-resistant fat to the interior of the container in U.S. Pat. No. 4,390,553 (Rubenstein).

Accordingly, a need has existed for a means for preventing migration of moisture between various components of a food composition when one component is dryer than another component. This is particularly true for food products which are prepared days or weeks before the intended time for consumption and stored in frozen form. Modern production and distribution of convenience foods which can be ultimately prepared by the consumer with minimal final cooking time demands methods of production which will provide both ease of industrial preparation while still assuring an ultimate product of quality as close to freshly prepared as possible.

Thus, it is an object of the present invention to provide a fast, convenient and effective method of preparing a filled food product which has effectively minimized moisture migration between components thereof.

Another object of this invention is to provide a method for continuous production of all natural convenience foods (e.g., a pizza crust roll filled with pizza sauce and "toppings") which have an extended shelf life by virtue of effective minimization of moisture migration between components of the food product.

These objects and other advantages of this invention will become more apparent from the following description and the details discussed therein.

BRIEF DESCRIPTION OF THE INVENTION

An encrusted food product having a pastry or bread encapsulating shell filled by a more moist food material with a sealing layer provided therebetween is prepared by the steps which comprise:

a) co-extruding dough with a cavity-forming sealant material whereby the dough forms an encapsulation shell surrounding said material, b) subjecting the co-extruded article from a) to a temperature sufficient to at least partially bake the dough and to cause cavity-forming sealant material to melt and generate gases whereby the gases expand and create an open cavity within the encapsulating dough and the cavity is lined with molten material thereby providing a sealant for the dough exterior to the cavity, c) setting the molten material lining the dough cavity by cooling the article from b), and thereafter, d) providing the sealant lined cavity with a food sauce by injecting the sauce into the cavity.

DETAILED DESCRIPTION

The method Which is the present invention begins with preparation of a dough and a cavity-forming sealant material which are co-extruded with the former encapsulating the latter. Preparation of dough from flour, yeast and other additives is well known in the art as are precise formulations to achieve a desired texture, consistency and taste of the ultimate baked dough. However, for the present invention it is preferred to use flour with a high gluten content which will confer the property of toughness and elasticity on the dough. Those properties are desirable so that when the cavity-forming sealant material produces gases during baking thereby causing expansion of the encapsulating dough, the encapsulation will remain sealed and will not burst. The most preferred dough is a conventional dough of enriched brominated bread flour with 14% balancer.

The cavity-forming sealant material performs two functions in the present invention. At baking temperatures the material must be capable of giving off a gas which upon expansion causes creation of an open space within the encapsulating dough. Simultaneously, the material must become sufficiently pasty and molten at baking temperatures to coat and seal against moisture the open space formed within the encapsulating dough. It has been found that cheese obtained from dairy products is suitable for this purpose. For preparation of a pizza roll, the preferred cheese is a mozzarella cheese. Of course, mozzarella can be mixed with other cheeses, such as romano or ricotta. Also, if desired, the cheese can be mixed with additional materials to modify its taste and consistency. One particularly suitable cheese mixture serving as the cavity-forming sealant material for a pizza roll is a mixture of mozzarella cheese and tomato sauce.

Cavity-forming sealant material can be encapsulated by dough in any suitable physical form and can be considered to be of a core/shell structure with the cavity-forming sealant as the core with the dough as a shape-conforming shell. Shapes such as spherical, tubular, square, rectangular or any other desired shape are suitable. The core/shell structure is preferred to be formed by co-extruding dough and cavity-forming sealant through known co-extruding devices. A suitable devise is a Rheon Cornucopia KN200 manufactured by Rheon Automatic Machinery Company, LTD., of Utsunomiya, Japan.

The relative amounts of dough and cavity-forming sealant can be easily selected by one skilled in the art based on the desired overall exterior size of the ultimate core/shell structure and the size of the interior cavity desired. Accordingly, a wide range of proportions of dough to cavity-forming sealant are within the scope of this invention. For instance, if a thin crust of baked dough is desired, a smaller amount of dough can be used to encapsulate the cavity-forming sealant than if a thicker crust is desired. Similarly, if a relatively large cavity within the baked crust is desired then a larger amount of cavity-forming sealant is encapsulated in the dough, than if a smaller cavity is required. In other words, the amount of encapsulating dough defines ultimate bread crust thickness and the amount of encapsulated cavity-forming sealant determines the size of the cavity formed. These parameters can be easily adjusted by one skilled in the art to obtain the desired product.

After the cavity-forming sealant is encapsulated with dough by co-extrusion, the resulting core/shell structure is subjected to conditions which will bake the dough and cause formation of an open cavity therein which is coated with a moisture sealant. Accordingly, it is preferred to first subject the raw core/shell structure to a proofing step wherein the dough is permitted to at least partially ferment and rise. Conditions for proofing are well known in the art and the conditions can comprise subjecting the core/shell structure to a temperature from slightly above room temperature to about 100° F. for a time of about 15 to 60 minutes. After proofing the core/shell structure is baked under normal baking conditions of about 400° to 600° F. for up to about 15 minutes. Baking serves to create the cavity against moisture and convert the dough to bread. Thus, upon completion of the baking step, the product obtained is a hollow bread article with its hollow cavity lined with a moisture sealing barrier which in the preferred embodiment comprises mozzarella cheese.

When the baking is complete, the hollow bread article is removed from the baking oven and allowed to stand at room temperature for a short time (for example, 5 to 30 minutes). Thereafter, the hollow bread article is cooled in a standard refrigerator (35° to 50° F.) to solidify and set the cheese moisture sealing barrier which lines the cavity within the baked dough. Cooling can require up to about an hour depending on the size of the hollow baked article.

After the baked article is cooled and the moisture sealing lining the interior cavity is set, the cavity can be filled with any desired food filling. A wide variety of food fillings can be used but whatever filling is used, it is usually injected into the cavity of the baked article as a paste which can be more or less fluid and flowable. In the preferred embodiment of this invention, the food filling can be a tomato-based pizza sauce. In addition, more pizza cheese and conventional pizza topping materials can be added to the sauce. For example, the tomato-based pizza sauce can additionally contain mozzarella cheese, romano cheese, meat, onion, peppers, mushrooms and so forth.

Injecting the food filling into the cavity of the baked article completes the preparation of the encrusted food product of this invention and that product is then ready for consumption. The moisture barrier between the food filling and the encrusting bread material, however, prolongs the quality of the product between the time or preparation and the time of consumption by preventing moisture migration from the food filling into the encrusting bread. This is a significant advantage in commercial preparation of encrusted food products with a uniform quality not withstanding different times from production. Also, the filled products can be frozen and stored for a long period of time without loss of product quality caused by moisture migration between the food filling and encrusting bread.

The preferred embodiment of this invention is a method of preparing individual pizza rolls which is described in detail in the following example.

EXAMPLE

Pizza Roll

I. A dough mixture is prepared from the following ingredients:

| | |
|---|---|
| High Gluten Flour | 83 pounds |
| Semolina Flour | 17 pounds |
| Dry Yeast | 1.5 pounds |
| Salt | 1.0 pounds |
| Dextrose | 1.0 pounds |
| Olive Oil | 6.25 pounds |
| Coloring | 0.025 pounds |
| Water | 75 pounds |
| S-500 Conditioner | 1.25 pounds |

II. A cheese-based cavity-forming sealant material is prepared with the following proportions:

| | |
|---|---|
| Mozzarella Cheese | 65% |
| Romano Cheese | 17.5% |
| Ricotta Cheese | 17.5% |

The dough mixture (I) and the cheese-based material (II) are placed in separate hoppers of a co-extrusion machine such as a Rheon Cornucopia KN200 or 208 SD type manufactured by Rheon Automatic Machinery Co., LTD. of Utsunomiya, Japan. Pillow shaped portions of (I) and (II) are co-extruded with the dough entirely covering and encapsulating the cheese-based material. About 1.5 oz. of cheese-based material is encapsulated by about 3.75 oz. of dough and the size of each cylinderically shaped portion is about six inches by two inches in diameter.

The co-extruded pillow shaped portions are then transferred to a proving and baking oven. The portions are subjected to a proving at about 90° F. for 30–40 minutes and thereafter baked at 475°–525° F. for 5–10 minutes during which the cheese-based material melts and produces gases which expand to produce a cavity or void within the encapsulating dough which is of a size sufficient to hold about ¾ ounce of sauce filling.

After removing from the baking oven, the portions are allowed to stand on a waiting rack at room temperature for about 30 minutes and then placed in standard refrigeration and cooled for about ½ to ¾ hours. During the cooling, the melted cheese-based material which coats the interior surface of the dough cavity formed by the expanding gases sets and serves as a sealant between the baked dough and filler subsequently added to the cavity.

When the cheese-based material sets, each portion is ready for filling. Each portion is moved into a machine which injects a predetermined amount of a tomato-based pizza sauce into the cavity. An injection machine such as a Rheon Injector 8 is suitable. The sauce contains:

| | |
|---|---|
| Tomato Sauce/Tomato Paste (50/50) | 22.5 pounds |
| Oregano | 1 ounce |
| Parsley | 1 ounce |
| Curry | 2 ounce |
| Sweet Basil | 1 ounce |
| Garlic | 1 ounce |

Each pizza-sauce filled portion is then frozen and packaged for commercial distribution as a pizza roll.

The ultimate consumer completes preparation of the individual pizza rolls by crisping and warming in a conventional oven or in a microwave oven or by defrosting and heating in a toaster oven. If the packaging is to be for microwave warming, the individual rolls are packaged with a Mylar ® crisper made by DuPont. Otherwise, for convection oven or toaster oven, any convenient packaging can be used.

Having described the present invention, it would be readily apparent to those in the art that various changes can be made without departing from the invention and, as such, the invention is not limited by the example or the description in the specification but, rather, only as indicated by the following claims.

What is claimed is:

1. A method for preparing an encrusted pizza food product which comprises:
   a) co-extruding dough with a cheese whereby the dough forms an encapsulation shell surrounding the cheese,
   b) subjecting the co-extruded article from a) to a temperature sufficient to at least partially bake the dough and to cause the cheese to melt and generate gases whereby the gases expand and create an open cavity within the encapsulating dough and the cavity is lined with molten cheese thereby providing a sealant for the dough exterior to the cavity,
   c) setting the molten cheese lining the dough cavity by chilling the article from b), and thereafter,
   d) providing the lined cavity with a pizza sauce by injecting the pizza sauce into cavity.

2. A method for preparing the pizza food product according to claim 1 wherein the extruded dough in step a) is a pastry dough.

3. A method for preparing the pizza food product according to claim 2 wherein the extruded dough in step a) is a pizza pastry dough.

4. A method for preparing the pizza food product according to claim 1 wherein the co-extruded cheese in step a) is mixed with tomato sauce.

5. A method for preparing the pizza food product according to claim 1 wherein the cheese is a pizza cheese.

6. A method for preparing the pizza food product according to claim 1 wherein the cheese is mozzarella.

7. A method for preparing the pizza food product according to claim 1 wherein prior to step b) the co-extruded article from a) is subjected to a proofing step whereby the dough is fermented and rises.

8. A method for preparing the pizza food product according to claim 1 wherein the pizza sauce in step d) is a tomato-based pizza sauce.

9. A method for preparing the pizza food product according to claim 1 wherein the pizza sauce in step d) is a tomato-based sauce mixed with cheese.

* * * * *